Figure 1:
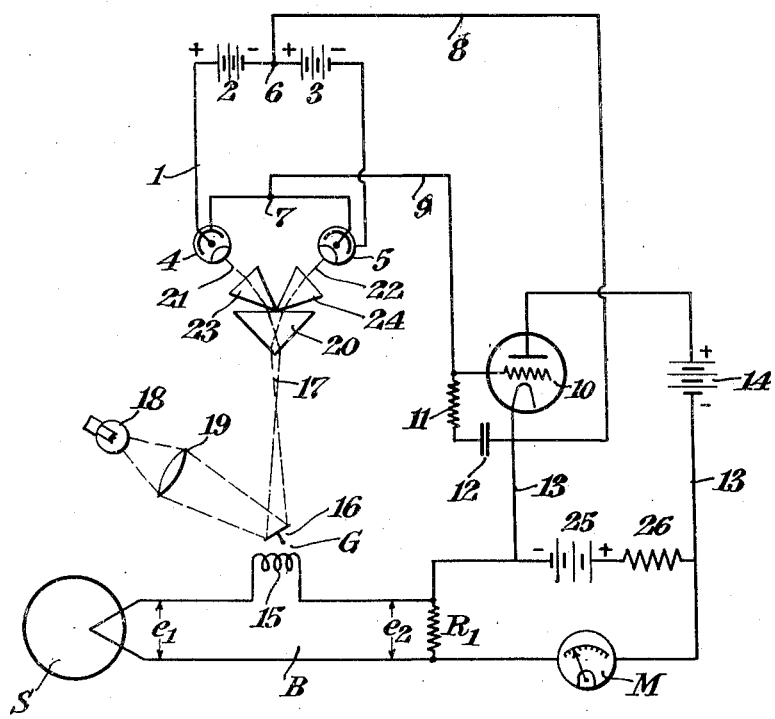

Nov. 3, 1936. R. W. GILBERT 2,059,786
POTENTIOMETRIC INDICATOR
Filed Jan. 5, 1935 2 Sheets-Sheet 1

INVENTOR
Roswell Ward Gilbert
BY
ATTORNEYS

Nov. 3, 1936.    R. W. GILBERT    2,059,786
POTENTIOMETRIC INDICATOR
Filed Jan. 5, 1935    2 Sheets-Sheet 2
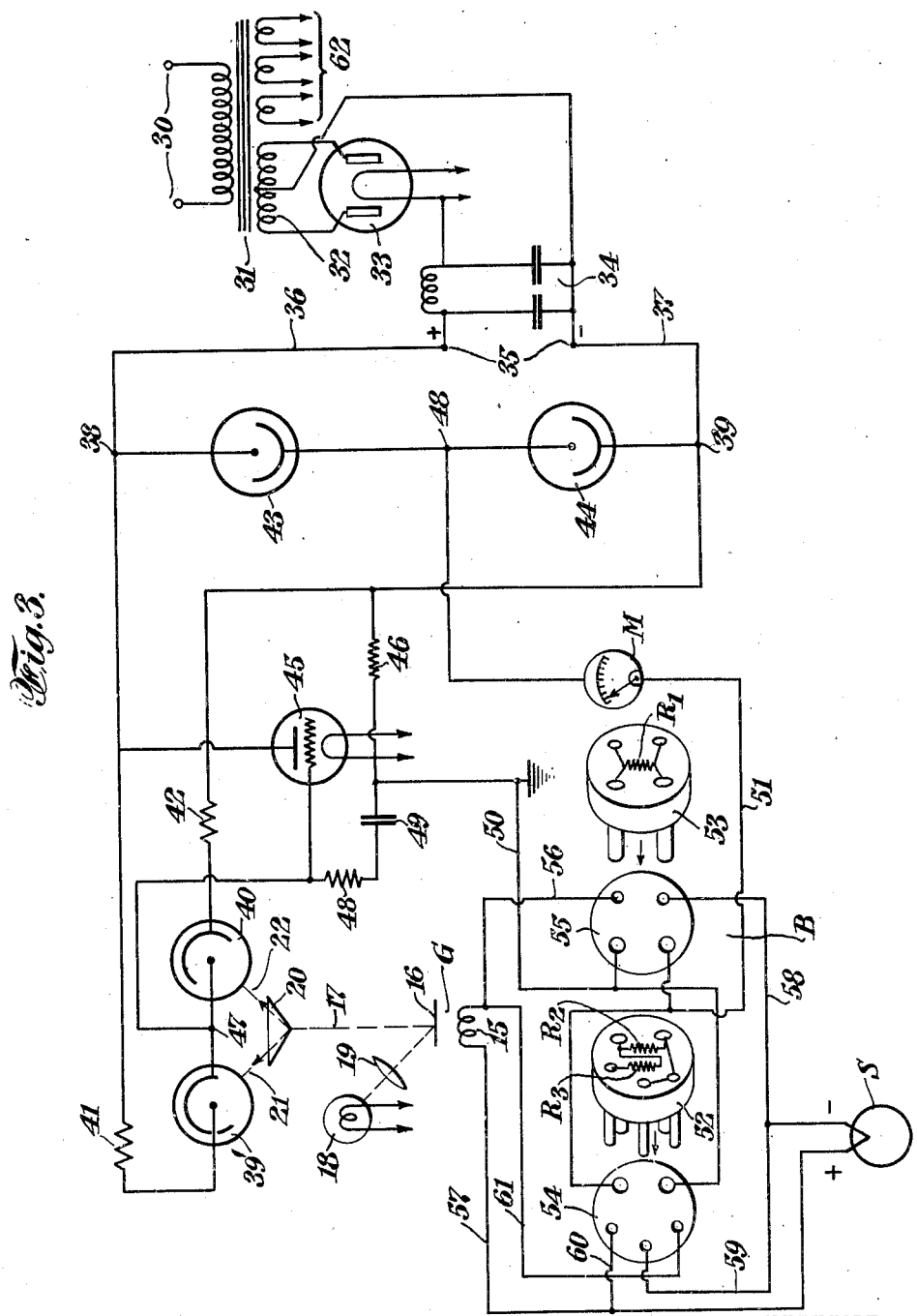
INVENTOR
*Roswell Ward Gilbert*
BY
*Ward, Crosby & Neal*
ATTORNEYS Patented Nov. 3, 1936

2,059,786

UNITED STATES PATENT OFFICE 2,059,786

POTENTIOMETRIC INDICATOR

Roswell Ward Gilbert, East Orange, N. J., assignor to Gilbert Corporation, East Orange, N. J., a corporation of New Jersey Application January 5, 1935, Serial No. 530

10 Claims. (Cl. 250—41.5)

This invention relates to automatic potentiometric balancing and indicating apparatus adapted more particularly to the measurement of extremely small voltages or currents. This application is a continuation in part of my copending application Serial No. 702,540, filed December 15, 1933, now Patent No. 2,011,315.

In one of its modifications the invention finds utility in recording pyrometry, for measuring voltage changes of thermo-couples, photoelectric cells, and the like, exposed to variations in temperature or radiant energy.

The invention also finds utility for determining variations of electrolytic conditions of industrial solutions, particularly in the determination of pH values of solutions, wherein it is desirable to measure accurately and automatically small voltage variations potentiometrically.

In another of its modifications the invention finds utility in the measurement of no load or open circuit voltages of small magnitude, particularly where the internal resistance of the source is variable, as in the case of thermo-couples, etc.

The device is likewise adaptable to the measurement of current without adding any IR drop to the circuit to be measured, as for example the current flow in a voltage source having its output terminals short-circuited. This is desired in some cases such as for use with the voltaic type of photoelectric cell.

It is generally conceded that the measurement of small potentials, such as are encountered in pH determination cells, and thermo-couples, is best accomplished through the medium of a potentiometric balance. This method, by substantially preventing current flow in the cell or couple, eliminates sources of error which might result from the presence of resistance in the circuit, or from changes of resistance in the circuit.

Instruments now in use for the automatic measurement of small voltages by potentiometric means, such as recording pyrometers, resort to intricate mechanical devices that are expensive and require extreme care. Recording pyrometry and instruments for recording pH values of electrolytic solutions would, undoubtedly, be more extensively used in the industries were a simple and rugged, yet accurate, device available in place of the present complicated structures.

It is the purposes of this invention to provide such a device, employing but a single mechanically movable element of simple and rugged construction, and no contacting elements, for the automatic maintenance of a potentiometric balance; and the amplifying action of an electronic device to provide a relatively heavy operating current varying in direct proportionality with potential or current changes of the source under observation, for the operation of an indicating or recording apparatus.

In accordance with the invention, the source to be measured is arranged in parallel with a fixed resistance traversed by space current supplied from a grid-controlled electronic tube, the input or grid circuit of which comprises a conjugate arm of an electrical bridge containing fixed and variable voltage ratio balancing arms arranged in adjacent pairs. The parallel arrangement of the voltage source and shunt resistance constitutes a balancing circuit wherein a galvanometer responding to unbalanced current flow in this circuit automatically so adjusts the voltage ratio of the variable bridge arms and hence the grid voltage applied to the electronic tube in the conjugate arm, as to restore and maintain a condition of electrical equilibrium in the balancing circuit in consequence of the change in space current of the electronic tube accompanying the mentioned alteration in its grid potential.

In my application Serial No. 702,540, filed December 15, 1933, which became Patent No. 2,011,-315 on August 13, 1935, I have described apparatus operating in the manner outlined, in which the variable bridge arms comprise the space paths respectively of a pair of grid-controlled electronic tubes operating as detectors, the space path resistances of which are oppositely varied appropriately to preserve the mentioned condition of equilibrium in the balancing circuit by causing the galvanometer therein to displace an electrode between spaced condenser plates of a high frequency supply circuit grounded at an intermediate point to the electrode, and to opposite sides of the ground potential of which the respective grids of the electronic tube are tapped. Although this modification of the invention is appropriate for certain types of measurements, the high frequency form of control is not always convenient owing to the added complexity. The present invention therefore proposes to supplant this feature of my former application with an arrangement whereby a focused light beam governs the condition of balance.

According to the arrangement proposed herein, the variable balancing arms of the bridge comprise the current paths respectively of a pair of photoelectric elements illuminated from a focused beam reflected by a deflectable mirror responsive to flow of unbalanced current in the galvanometer coil, onto the apex of a prism whence the impinging beam is split into a pair of emergent beams oppositely directed onto the photoelectric elements respectively. In consequence, any movement of the galvanometer mirror in response to flow of unbalanced current in the balancing circuit will increase the illumination of one photoelectric element, while proportionately decreasing the illumination of the other, thereby unbalancing the bridge in a direction and to the degree requisite to restoration of electrical equilibrium in the balancing circuit.

Due to the amplifying action of the electronic tube disposed in the conjugate bridge arm, variations in the electrical condition of the source to be measured will produce equivalent variations but on a magnified scale in the space current of the electronic tube. Accordingly, variations of the source may be indicated conveniently on a meter or recorder of rugged construction responsive to the electronic tube space current.

Figure 2:
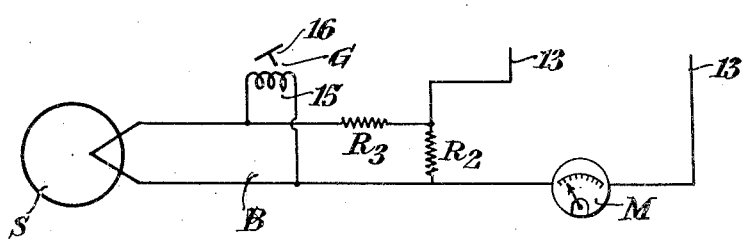

In the drawings:

Fig. 1 shows diagrammatically a circuit in accordance with the invention as arranged for indicating the open circuit voltage of the source under measurement. The circuit is simplified to delineate the principles of operation, by employment of a plurality of batteries instead of the single source of energizing voltage;

Fig. 2 is a modified detail of the Fig. 1 circuit as arranged to measure the short-circuited output current of the source, in contrast to its open circuit voltage; and Fig. 3 is a modified circuit in accordance with the invention adapted for complete energization from a single voltage source, such as the house supply of alternating current. This circuit is further arranged by means of suitable plug-in resistors for measurement either of the open circuit voltage or the short-circuited output current of the source.

In the Fig. 1 form of execution, there is shown an electrical bridge 1 consisting of batteries 2, 3, comprising adjacent balancing arms of fixed voltage ratio connected in series with the current paths of a pair of photoelectric elements or tubes 4, 5, the latter comprising adjacent balancing arms of variable voltage ratio. The conjugate points 6, 7 of the bridge are connected by conductors 8 and 9 to the cathode and grid respectively of an electronic tube 10. A resistance 11 and condenser 12 are connected in series between the cathode and grid of tube 10 to provide a damping circuit which determines the interval required for the apparatus to adjust itself to a condition of balance.

A connection 13, extending from anode to cathode of tube 10, contains in series a plate battery 14, a meter M, and a resistor $R_1$. The voltage source S to be measured, such as a thermocouple, photocell, etc., is connected through the actuating coil 15 of a galvanometer G, in parallel with resistance $R_1$, to provide a balancing circuit B. For proper operation the voltage $e_1$, of source S, in poled in opposition to the voltage drop $e_2$ across resistance $R_1$ due to the flow therein of space current of tube 10. Mirror 16 of galvanometer G directs a beam 17 from a light source 18, focused by lens 19, onto the apex of a prism 20. Prism 20 splits the impinging beam 17 into a pair of emergent beams 21, 22, oppositely and adjustably directed by the auxiliary prisms 23, 24 onto the photoelectric elements 4 and 5, respectively.

In order to operate tube 10 over a desirable portion of its grid voltage-plate current characteristic, and to provide a definite zero reading on meter M by allowing an actual reversal of current through resistor $R_1$ and meter M when the space current of tube 10 drops below a certain value, a compensating shunt comprising a battery 25 and a resistance 26 are connected in series between the cathode of tube 10 and the negative side of plate battery 14, with battery 25 poled in opposition to battery 14 across the resistor $R_1$ and the meter M.

Should the voltage $e_1$ at the instant of connection of source S, or subsequently, exceed the voltage $e_2$, there will be established in the balancing circuit B a flow of unbalanced current having the conventional direction from $e_2$ to $e_1$. For proper operation, coil 15 of the galvanometer G is so connected in circuit B that a flow of unbalanced current from $e_2$ to $e_1$ will produce rotation of the mirror 16 in a clockwise direction, thereby increasing the illumination of photoelectric element 4, while decreasing that of element 5 proportionately. The resistance of element 5 will thus increase while that of element 4 will decrease to cause the potential of conjugate point 7 to assume an increasingly positive potential with respect to conjugate point 6, thereby to increase in a positive direction the grid voltage applied to tube 10. The space current of tube 10 will therefore increase with continued clockwise rotation of mirror 16 until the voltage $e_2$ assumes a value equal to the initially greater voltage of source $e_1$, whereupon the unbalanced current in circuit B will be reduced to zero and the mirror 16 left in the position to which it has been thus rotated.

If now the voltage $e_1$ increases further, the process described will be repeated until a new condition of balance obtains. On the other hand, if voltage $e_1$ should decrease in value the entire train of operations described will be reversed to decrease voltage $e_2$ until it again equals voltage $e_1$. To effect such a balance there will occur a flow of unbalanced current through coil 15 in the conventional direction from $e_1$ to $e_2$, to rotate mirror 16 counterclockwise, thereby to increase the grid voltage of tube 13 in a negative direction and consequently to decrease its space current and hence voltage $e_2$ until it equals voltage $e_1$.

Fig. 2 shows an adaptation whereby the device of Fig. 1 is enabled to measure current without introducing resistance or load into the circuit being measured. This is of advantage in many cases, for example, in measuring the no-load current of a voltaic photocell. It consists in placing in series with one of the conductors of the balanced circuit B, a resistance $R_3$, and arranging the actuating coil 15 of the galvanometer in shunt to source S. For this condition the voltage of source S must be poled series aiding with the voltage across resistance $R_2$ corresponding in location to resistance $R_1$ of Fig. 1. The circuit adjusts itself for balance with no current flowing in coil 15, which is equivalent to short-circuiting the output of source S. The current being measured is therefore equal to the current through resistance $R_3$, which is equal to the current measured by meter M multiplied by the ratio $$\frac{R_2}{R_2+R_3}$$

The system of Fig. 3 combines the features of Figs. 1 and 2 in apparatus energized from a single alternating current source connected to the input terminals 30 of a multi-coil transformer 31 having a secondary coil 32 connected in a conventional manner to a full wave rectifier tube 33 and associated low pass output filter 34 for supplying unidirectional and substantially non-fluctuating voltage of the polarity indicated at the filter output terminals 35.

The voltage at terminals 35 is applied over conductors 36, 37 to conjugate points 38, 39 of an electrical bridge, the adjacent balancing arms of variable voltage ratio of which comprise, as in Fig. 1, the current paths of a pair of photoelectric elements 39', 40, in series respectively with protective resistors 41, 42; and the adjacent balancing arms of fixed voltage ratio of which comprise the space paths of a pair of gaseous or glow discharge tubes 43, 44. The space paths of tubes 43, 44 and also those of elements 39', 40, if the photoelectric tube construction is employed as indicated, are series connected in pairs between conjugate points 38, 39 with their cathodes toward the negative side of source 35.

In the circuit of Fig. 3, the glow discharge tubes 43, 44 are the full equivalent of the batteries 2, 3 in Fig. 1, since it is inherent in this type of tube that once the glow discharge is established, the voltage drop across it remains substantially constant for a relatively wide range of variations in space current.

The grid-controlled electronic tube 45, which controls the adjustment of balancing circuit B, has its space or cathode-anode path connected in series with a resistance 46 between the conjugate points 38, 39 of the bridge. The grid circuit of the tube is, however, arranged in the other conjugate arm of the bridge traced from conjugate point 47, through resistance 48 and condenser 49—constituting the damping impedance between grid and cathode of tube 45—,thence over conductor 50 and through the balancing circuit B, as will be explained, over conductor 51 and through meter M to conjugate point 48.

The balancing circuit B of Fig. 3 is equipped with multi-pronged plugs 52, 53 insertable in sockets 54, 55 for adapting the balancing circuit B either to measurement of the open circuit voltage of source S in accordance with the arrangement of Fig. 1, or for measuring the short-circuited output current of source S, in the manner of Fig. 2.

The four pronged plug 53 has incorporated therein a resistance $R_1$ connected to the various prongs, as shown. When this plug is inserted in the associated socket 55 the balancing circuit B will be arranged as in Fig. 1. Current traversing the space path of tube 45 will flow through resistance $R_1$ over a circuit traced from the anode of tube 45, through the space path of the glow discharge tube 43, the voltage drop across which energizes the circuit in question at substantially constant voltage as explained, thence from conjugate point 48 through meter M over conductor 51, through resistance $R_1$, and over conductor 50 to the cathode of tube 45.

Current of opposite polarity to that provided by the voltage drop across glow discharge tube 43, will also tend to flow through resistance $R_1$ and meter M, due to the compensating circuit traced from conjugate point 48 through glow discharge tube 44, resistance 46, over conductor 50, through resistance $R_1$ and over conductor 51 containing meter M, back to conjugate point 49. By properly choosing the value of resistance 46 in relation to the remaining circuit constants, the tube may be operated over a desirable portion of its grid voltage-plate current characteristic, in a manner analogous to that described for the compensating shunt 25, 26 of Fig. 1.

Resistance $R_1$ is connected through the right hand contacts of socket 55 in shunt to the voltage source S in accordance with the Fig. 1 arrangement, by the path extending from the upper right hand terminal of socket 55 over conductor 56, through the actuating coil 15 of galvanometer G, over conductor 57, through source S and over conductor 58 to the lower right hand terminal of socket 55. With the indicated polarity, the voltage of source S will oppose the voltage drop across resistance $R_1$.

If now plug 53 is removed from socket 55 and plug 52 inserted in socket 54, the arrangement will be that of Fig. 2. Since conductors 50, 51 are connected to contacts of socket 54 as well as to contacts of socket 55, space current of tube 45 supplied to these conductors in the manner previously described will now flow through resistance $R_2$ but in a direction opposite to that in which it traversed resistance $R_1$. Accordingly, with the polarity of source S as indicated, the voltage drop across resistance $R_2$ will aid that of S in the balancing circuit B, due to the connection of source S over conductors 59, 60 to contacts of socket 54 in the manner shown. The actuating coil 15 of galvanometer G is also bridged by connections 57, 61 across source S with resistance $R_3$ serially interposed between them and resistance $R_2$, as shown in Fig. 2.

The optical system of Fig. 3 requires no detailed explanation, being identical with that of Fig. 1 with the components similarly designated. The filaments of elements 18, 33, 45 are energized by the secondary coil 62 respectively of transformer 31, the connections being omitted to minimize confusion in the drawings.

What is claimed is:

1. Device responsive to a small voltage source comprising: an electrical bridge having as adjacent balancing arms the current paths respectively of a pair of photoelectric elements, and as a conjugate arm the input to a grid-controlled space discharge device, means for supplying uninterrupted and substantially non-pulsating direct current and voltage to said photoelectric elements and to said space discharge device, a balancing circuit traversed by space current of said device, said balancing circuit including said small voltage source and resistance effectively shunting said source, means for illuminating said photoelectric elements, means responsive to unbalanced current flow in said balancing circuit for oppositely varying the illumination of said photoelectric elements automatically to restore and maintain a condition of electrical equilibrium in said balancing circuit, and translating means responsive to space current of said discharge device.

2. Device responsive to a small voltage source comprising: an electrical bridge having as adjacent balancing arms the current paths respectively of a pair of photoelectric elements, and as a conjugate arm the input to a grid-controlled electronic tube, means for supplying uninterrupted and substantially non-pulsating direct current and voltage to said photoelectric elements and to said electronic tube, a balancing circuit traversed by space current of said tube, said balancing circuit including said small voltage source and resistance effectively shunting said source, means for illuminating said photoelectric elements, means responsive to unbalanced current flow in said balancing circuit for oppositely varying the illumination of said elements automatically to restore and maintain a condition of electrical equilibrium in said circuit, and translating means responsive to space current of said electronic tube.

3. Device responsive to a small voltage source comprising: an electrical bridge containing adjacent pairs of fixed and variable ratio balancing arms, the latter comprising the current paths respectively of a pair of photoelectric elements, and a conjugate arm containing the input to a grid-controlled electronic tube, means for supplying uninterrupted and substantially non-pulsating direct current and voltage to said photoelectric elements and to said electronic tube, a balancing circuit traversed by space current of said tube, said balancing circuit including said small voltage source and resistance effectively shunting said source, means for illuminating said photoelectric elements, means responsive to unbalanced current flow in said balancing circuit for oppositely varying the illumination of said elements automatically to restore and maintain a condition of electrical equilibrium in said circuit, and translating means responsive to space current of said electronic tube.

4. Device responsive to a small voltage source comprising: an electrical bridge containing adjacent pairs of fixed and variable ratio balancing arms, the latter comprising the current paths respectively of a pair of photoelectric elements, and a conjugate arm containing the input to a grid-controlled electronic tube, means for supplying uninterrupted and substantially non-pulsating direct current and voltage to said photoelectric elements and to said electronic tube, a balancing circuit traversed by space current to said tube containing said small voltage source and resistance effectively in parallel therewith, the voltage across which opposes the voltage of said source, means for illuminating said photoelectric elements, means responsive to unbalanced current flow in said balancing circuit for oppositely varying the illumination of said elements automatically to restore and maintain in said balancing circuit a condition of voltage equilibrium between the open circuit voltage of said source and the voltage drop across said resistance, and translating means responsive to space current of said electronic tube.

5. Device responsive to a small current source comprising: an electrical bridge containing adjacent pairs of fixed and variable ratio balancing arms, the latter comprising the current paths respectively of a pair of photoelectric elements, and a conjugate arm containing the input to a grid-controlled electronic tube, a balancing circuit traversed by space current of said tube and containing said small current source and resistance effectively in parallel therewith, the current in which aids the current of said source, means for illuminating said photoelectric elements, means responsive to flow in said balancing circuit of current differing from the short-circuited output current of said source for oppositely varying the illumination of said photoelectric elements automatically to restore and maintain the current in said source equal to its short-circuited output current, and translating means responsive to space current of said electronic tube.

6. Device responsive to a small voltage source comprising: an electrical bridge containing adjacent pairs of fixed and variable ratio balancing arms, the latter comprising the current paths respectively of a pair of photoelectric elements, and a conjugate arm containing the input to a grid-controlled electronic tube, means for supplying uninterrupted and substantially non-pulsating direct current and voltage to said photoelectric elements and to said electronic tube, a balancing circuit traversed by space current of said electronic tube and containing said small voltage source and resistance effectively in parallel therewith, means for illuminating said photoelectric elements, mirror deflecting galvanometric means responsive to unbalanced current flow in said balancing circuit for oppositely varying the illumination of said photoelectric elements respectively automatically to restore and maintain a condition of electrical equilibrium in said circuit, and translating means responsive to space current of said electronic tube.

7. Device responsive to a small voltage source comprising: an electrical bridge having as adjacent balancing arms the current paths respectively of a pair of photoelectric elements, and as a conjugate arm the input to a grid-controlled electronic tube, means for supplying uninterrupted and substantially non-pulsating direct current and voltage to said photoelectric elements and to said electronic tube, a balancing circuit traversed by space current of said tube and containing said small voltage source and resistance effectively in parallel therewith, the voltage of which opposes the voltage drop across said resistance, means for illuminating said photoelectric elements, said means including mirror deflecting galvanometer means having an actuating coil serially interposed in said balancing circuit for oppositely varying the illumination of said photoelectric elements in accordance with the flow of current in said actuating coil for automatically adjusting said balancing circuit to a condition of voltage equilibrium between the open circuit voltage of said source and the voltage across said resistance, and translating means responsive to space current of said electronic tube.

8. Device responsive to a small current source comprising: an electrical bridge having as adjacent balancing arms the current paths respectively of a pair of photoelectric elements, and as a conjugate arm the input to a grid-controlled electric tube, a first resistance traversed by space current of said tube, a path in shunt to said first resistance containing said small current source and a second resistance in series therewith, the current in which aids the current in said first resistance, means for illuminating said photoelectric elements, said means including mirror deflecting galvanometric means having an actuating coil connected in parallel to said voltage source for oppositely varying the illumination of said photoelectric elements in response to unbalanced current flow in said actuating coil thereby to maintain in said voltage source a current flow equal to the short-circuited output current, and translating means responsive to space current of said electronic tube.

9. Device responsive to a small voltage source comprising: an electrical bridge having as adjacent balancing arms the current paths respectively of a pair of photoelectric elements, and as a conjugate arm the input to a grid-controlled space discharge device, a balancing circuit traversed by space current of said device, said balancing circuit including said small voltage source and resistance effectively shunting said source, means for illuminating said photoelectric elements, means responsive to unbalanced current flow in said balancing circuit for oppositely varying the illumination of said photoelectric elements automatically to restore and maintain a condition of electrical equilibrium in said balancing circuit, translating means responsive to space current of said discharge device, a source of voltage for energizing the space path of said discharge device, and a compensating shunt connected across said translating device comprising resistance in series with a second source of voltage, said second source of voltage being poled to oppose the flow of space current in said translating device.

10. Device responsive to a small current source comprising: an electrical bridge containing adjacent pairs of fixed and variable ratio balancing arms, the latter comprising the current paths respectively of a pair of photoelectric elements, and a conjugate arm containing the input to a grid-controlled electronic tube, a balancing circuit traversed by space current of said tube and containing said small current source and resistance effectively in parallel therewith, the current in which aids the current of said source, means for illuminating said photoelectric elements, means responsive to flow in said balancing circuit of current differing from the short-circuited output current of said source for oppositely varying the illumination of said photoelectric elements automatically to restore and maintain the current in said source equal to its short-circuited output current, translating means responsive to space current of said electronic tube, a source of voltage for energizing the space path of said tube, and a compensating shunt connected across said translating device comprising resistance in series with a second source of voltage, said second source of voltage being poled to oppose the flow of space current in said translating device.

ROSWELL WARD GILBERT.